United States Patent
Ho

(10) Patent No.: US 7,474,686 B2
(45) Date of Patent: Jan. 6, 2009

(54) WIRELESS PERSONAL AREA NETWORKS WITH ROTATION OF FREQUENCY HOPPING SEQUENCES

(75) Inventor: Jin-Meng Ho, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 787 days.

(21) Appl. No.: 10/734,316

(22) Filed: Dec. 12, 2003

(65) Prior Publication Data
US 2004/0170217 A1    Sep. 2, 2004

Related U.S. Application Data

(60) Provisional application No. 60/450,804, filed on Feb. 28, 2003.

(51) Int. Cl.
*H04B 1/00* (2006.01)
(52) U.S. Cl. ..................................... 375/132
(58) Field of Classification Search ................ 375/132, 375/133, 134; 370/338, 349, 446, 345; 455/63.1
See application file for complete search history.

(56) References Cited

U.S. PATENT DOCUMENTS

| | | | | |
|---|---|---|---|---|
| 5,257,398 A | * | 10/1993 | Schaeffer | 455/452.2 |
| 5,533,025 A | * | 7/1996 | Fleek et al. | 370/445 |
| 5,586,120 A | * | 12/1996 | Cadd | 370/468 |
| 5,949,776 A | | 9/1999 | Mahany et al. | |
| 6,118,805 A | * | 9/2000 | Bergstrom et al. | 375/132 |
| 6,138,019 A | | 10/2000 | Trompower et al. | |
| 6,393,261 B1 | | 5/2002 | Lewis | |
| 2002/0109607 A1 | * | 8/2002 | Cumeralto et al. | 340/870.02 |
| 2003/0058829 A1 | * | 3/2003 | Batra | 370/345 |

FOREIGN PATENT DOCUMENTS

| | | |
|---|---|---|
| EP | 0 650 274 A2 | 4/1995 |
| WO | WO 99/57826 | 11/1999 |

OTHER PUBLICATIONS

"802.15.1, Wireless Medium Access Control (MAC) and Physical Layer (PHY) Specifications for Wireless Personal Area Networks (WPANs), Chapter 8.11: Hop Selection, pp. I-xx, 105-115", IEEE 802.15.1-2002, Jul. 14, 2002, XP002286076.

* cited by examiner

*Primary Examiner*—Chieh M Fan
*Assistant Examiner*—Jaison Joseph
(74) *Attorney, Agent, or Firm*—Ronald O. Neerings; Wade James Brady, III; Frederick J. Telecky, Jr.

(57) ABSTRACT

Wireless personal area networks with frequency hopping and rotation of the frequency hopping sequences. In one embodiment, a method of wireless communication is provided, the method including: transmitting a beacon frame by a piconet coordinator that specifies a rotation index and hopping index; receiving a beacon frame by a device associated with or to be associated with the piconet coordinator; extracting the rotation index and hopping index by the MAC of the recipient device and communicating them to the PHY for transmission and reception in a current superframe; missing a subsequent beacon frame by a recipient device; and using the rotation index and hopping index previously received to determine a current frequency hopping sequence for a current superframe following the missed beacon frame.

20 Claims, 2 Drawing Sheets

WIRELESS PERSONAL AREA NETWORKS WITH ROTATION OF FREQUENCY HOPPING SEQUENCES

PRIORITY CLAIM

This application claims priority to U.S. Provisional Patent Application Ser. No. 60/450,804, filed on Feb. 28, 2003, entitled "TI MAC Sublayer Proposal for IEEE 802.15 Task Group 3a In Support of Frequency Hopping PHY," incorporated herein by reference.

BACKGROUND

A network is a system that allows communication between members of the network. Wireless networks allow such communications without the physical constraints of cables and connectors. Recently, wireless local area networks (a local area network is a computer network covering a local area such as an office or a home) with ranges of about 100 meters or so have become popular. Wireless local area networks are generally tailored for use by computers, and as a consequence such networks provide fairly sophisticated protocols for establishing and maintaining communication links. Such networks, while useful, may be unsuitably complex and too power-hungry for electronic devices of the future.

A wireless personal area network is a network with a more limited range of about 10 meters or so. With the more limited range, such networks may have fewer members and require less power than local area networks. The IEEE (Institute of Electrical and Electronics Engineers) is developing a standard for wireless personal area networks. The IEEE 802.15.3 standard specifies a wireless personal area medium access control (MAC) protocol and a physical (PHY) layer that may offer low-power and low-cost communications with a data rate comparable to that of a wireless local area network. The standard coins the term "piconet" for a wireless personal area network having an ad hoc topology of devices coordinated by a piconet coordinator (PNC). Piconets form, reform, and abate spontaneously as various electronic devices enter and leave each other's proximity. Piconets may be characterized by their limited temporal and spatial extent. Physically adjacent devices may group themselves into multiple piconets running simultaneously.

The IEEE 802.15.3a task group is developing a new PHY layer operating in an ultra wide band (UWB) and providing very high data rates (in the order of 100 Mbps). Currently this PHY layer is based on frequency hopping (FH) orthogonal frequency division multiplexing (OFDM), whereby the OFDM symbols of a data packet are successively sent in a pre-ordered sequence of frequency bands comprising all or part of the UWB frequency range. There may be a variety of such sequences, which are referred to as frequency hopping (FH) sequences herein but may be given other terms in the final standard or the technical literature. The frequency hopping nature of the PHY makes simultaneously operating piconets susceptible to mutual interference. The draft IEEE standard proposes that each PNC selects an FH sequence for use by the devices in its piconet for data transmission. However, this creates a significant likelihood of repeated collisions between adjacent piconets that happened to have chosen the same FH sequence. Accordingly, a randomization mechanism for avoiding persistent interference and hence improving network performance (in terms of user throughput and delay) is desired for the robust operation of ad hoc piconets and other wireless personal area networks in general.

SUMMARY

Accordingly, there is disclosed herein wireless personal area networks with frequency hopping and rotation sequences. A rotation sequence is a sequence of frequency hopping sequences. Just as there are a variety of frequency hopping sequences, there are a variety of rotation sequences. A rotation sequence is identified by a rotation index while a frequency hopping sequence is identified by a hopping index. In one embodiment, a method of wireless communication is provided, the method including: transmitting a beacon frame by a piconet coordinator that specifies a rotation index and hopping index; receiving the beacon frame by a device associated with or to be associated with the piconet coordinator; extracting the rotation index and hopping index by the MAC of the recipient device and communicating them to the PHY for transmission and reception in a current superframe; missing a subsequent beacon frame by a recipient device; and using the rotation index and hopping index previously received to determine a current frequency hopping sequence for a current superframe following the missed beacon frame. Each beacon frame includes a field that specifies a rotation sequence of frequency hopping sequences, and further includes a field that indicates a frequency hopping sequence to be used in the current superframe. The inclusion of the frequency hopping sequence enables devices to find out the frequency hopping sequence in use for the current superframe in case they have not received previous beacons.

BRIEF DESCRIPTION OF THE DRAWINGS

A better understanding of the present invention can be obtained when the following detailed description is considered in conjunction with the following drawings, in which.

Figure 1:
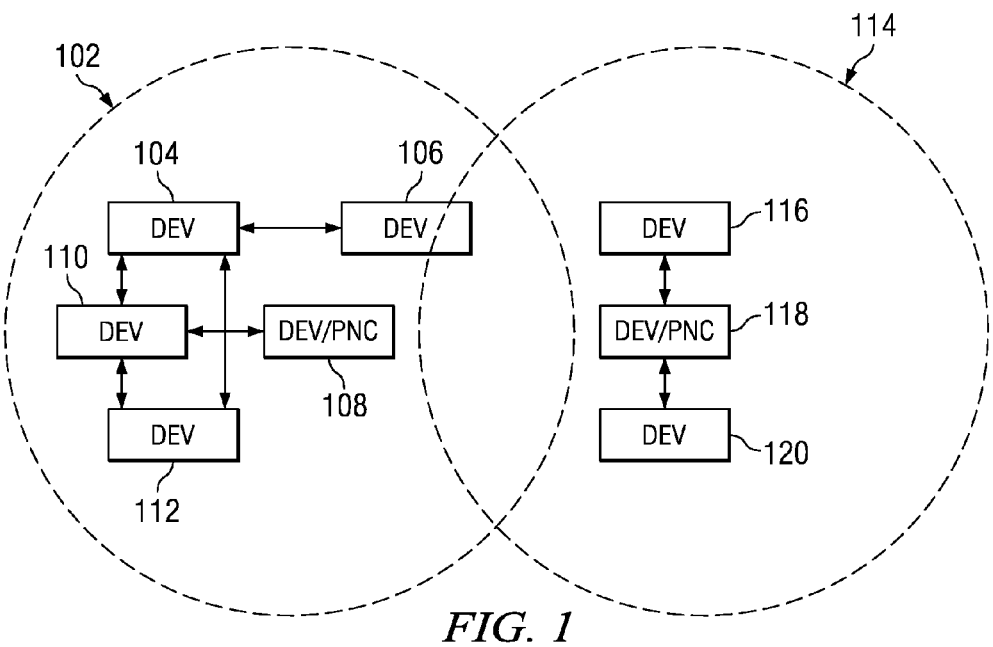
FIG. 1 shows two overlapping piconets.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

FIG. 1 shows a number of electronic devices that have cooperated to form two piconets 102, 114. Piconets have an ad hoc topology that results from the spontaneous combinations of devices that are in close proximity. Devices 104-112 are members of piconet 102, and devices 116-120 are members of piconet 114. Some or all of the devices that can participate in piconet communications can also operate as the piconet coordinator ("PNC"). In FIG. 1, device 108 is operating as the PNC for piconet 102, while device 118 is operating as the PNC for piconet 118. PNC devices 108, 118 broadcast beacon frames to facilitate the communications of their respective piconet members. The effective range of the beacons (and hence the effective boundary of the piconets) is shown by broken lines 102 and 114. Note that devices in one piconet (e.g., device 106) may be subject to radio interference in the other piconet.

In the configuration of FIG. 1, it is assumed that the piconets are operating independently. Nevertheless, such piconets may frequently synchronize with each other in starting a frame transmission. This is because the contention access method, referred to as carrier sense multiple access with collision avoidance (CSMA/CA), tends to force devices in overlapping piconets to start their transmissions after the end of a current transmission that they can hear. Such synchronization leads to mutual interference and hence repeated collisions between overlapping piconets operating on the same frequency hopping sequence, which in turn causes serious degradation in data throughput and access delay performance.

To combat interference, the piconets 102, 114 (FIG. 1) may employ different frequency hopping sequences so that they do not use the same frequency bands most of the time. To this end, a given piconet will not use the same hopping sequence indefinitely, but will employ different hopping sequences for different superframes. The hopping sequence to be used for a particular superframe by the devices in that piconet is provided in the beacon sent by the PNC of the piconet. To enable devices that miss one or more beacons to continue their transmission and reception without interruption, as is important for audio/video streaming, the hopping sequences to be used in successive superframes are pre-ordered into a rotation sequence which is also identified in each beacon. More details are given below in connection with FIG. 3.

FIGS. 2A-2E show an illustrative framing structure. In each of these figures, the time axis increases from right to left, so that the rightmost portion of the figure corresponds to the earliest portion of the communications sequence, and the leftmost portion corresponds to the latest portion of the sequence. The figures are not to scale.

Figure 2A:
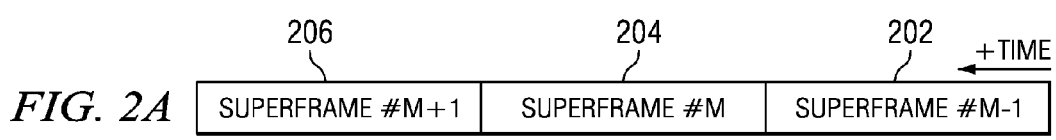
FIGS. 2A-2E show a framing structure for piconet communications.
Figure 2B:
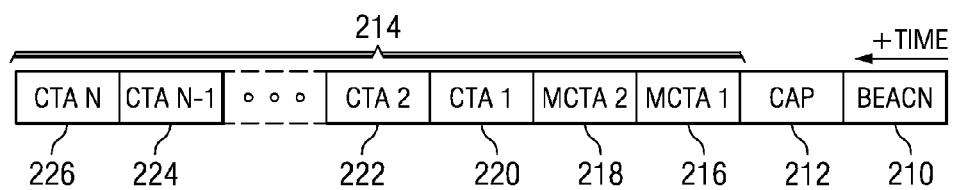

FIG. 2A shows a sequence of superframes that includes superframes 202, 204, and 206, which occur in order from right to left. As shown in FIG. 2B, each superframe begins with a beacon frame 210, which is transmitted by the PNC. The beacon 210 is followed by an optional contention access period ("CAP") 212. During the CAP, the piconet member devices may attempt communications using a CSMA/CA protocol. The optional CAP 212 is followed by a channel time allocation period ("CTAP") 214, which is composed of channel time allocations ("CTAs") 216-226. Any of the CTAs in the channel time allocation period 214 may be management CTAs ("MCTAs") (e.g., MCTAs 216, 218). CTAs are allocated for communications from a specified source device to a specified destination device or a group of destination devices. The length of the CAP and the allocations of the CTAs are specified in the beacon frame.

The member devices may request channel time allocations by sending management frames to the PNC. Depending on parameters specified by the beacon, the management frames may be sent during the CAP or during MCTAs. Similarly, data frames may be exchanged by member devices during the CAP or CTAs.

Figure 2C:
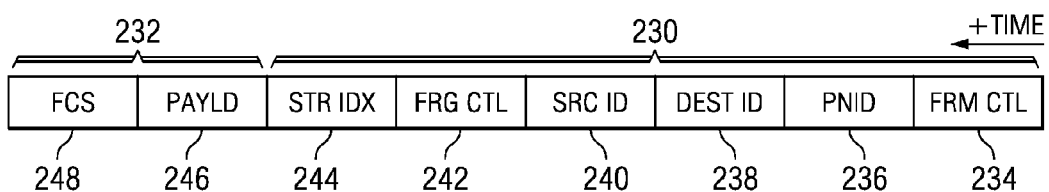

FIG. 2C shows the frame format for each frame sent during the superframe (including the beacon frame, any management frames, data frames, and acknowledgment frames). Each frame includes a medium access control ("MAC") header 230, and a MAC frame body 232. Each is described in turn below.

The MAC header 230 includes a frame control field 234, a piconet identifier field 236, a destination identifier field 238, a source identifier field 240, a fragmentation control field 242, and a stream index field 244. The frame control field 234 may include a field that specifies the protocol version, a field that specifies the frame type (e.g., beacon, data, acknowledgment), a field that specifies whether the frame is security protected, a field that indicates the acknowledgment policy (e.g., none, immediate, delayed), a field that indicates whether the frame is a "retry" (i.e., a re-transmission of an earlier frame), and a field that indicates whether additional frames from the source will follow in the current CTA. The piconet identifier field 236 specifies a unique 16-bit identifier for the piconet. The destination identifier field 238 specifies an 8-bit piconet member device identifier for the device to which the frame is directed (special values may be used for broadcast or multicast frames). Similarly, the source identifier field 240 specifies the 8-bit piconet member device identifier for the device which is transmitting the frame. The fragmentation control field 242 includes fields that are used for reconstructing large data units that have been split into fragments small enough to be sent in MAC frames. The fragmentation control field 242 may include a field specifying a data unit number, a field specifying the current fragment number, and a field specifying the total number of fragments in the data unit. The stream index field 244 may specify a stream identifier for isochronous streams (which produces data in a periodic fashion) and asynchronous traffic (which may arrive for transfer any time).

The MAC frame body 232 includes a payload field 246, and a frame check sum field 248. The payload field 246 is a variable length field that carries the information that is to be transferred. Finally, the frame check sum field 248 contains a 32-bit cyclic redundancy code ("CRC") value that is calculated over the entire payload field 246. Corruption of the payload may be detected by comparing the frame check sum field value to a CRC value calculated over the received payload field by the MAC functionality of the receiver.

Figure 2D:
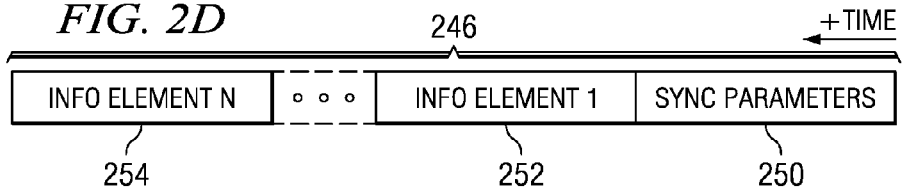

FIG. 2D shows the payload field 246 for a beacon frame. The beacon frame payload field 246 includes a piconet synchronization parameters field 250, and one or more information element fields 252, 254. The piconet synchronization parameters field 250 may include a field that specifies a time token (a 48-bit rollover counter that increments for each beacon), a field that specifies the duration of the superframe, a field that specifies the end of the contention access period, a field that specifies a maximum transmit power for piconet member devices, a field that specifies the piconet mode, a field that specifies the PNC response time, and a field that specifies the 8-byte device address for the PNC.

Figure 2E:
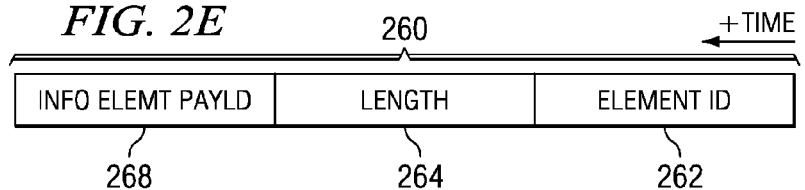

The information element fields 252-254 may be used to provide various piconet events and parameters including: PNC capabilities, a list of piconet member devices and their capabilities, a list of channel time allocations, CTA properties, device wake-up requests, shutdown notifications, piconet parameter changes, PNC handovers, transmit power control values, and identifiers of overlapping piconets. FIG. 2E shows the structure of a generic information element 260. Every information element includes an element identifier field 262 that specifies the information element type (e.g., a list of channel time allocations), a length field 264 that specifies the length of the information element payload field in bytes, and an information element payload field 268 that contains information in a format specific to the information element type.

Figure 3:
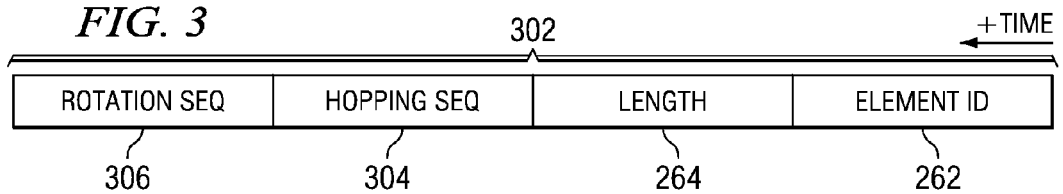
FIG. 3 shows an information element for communicating rotation and frequency hopping information in a beacon.

Before reaching FIG. 3, a further discussion of the rotation of frequency hopping sequences is appropriate. Each frame sent during the superframe may be divided into channel symbols. Channel symbols are specific to the modulated signal and are only indirectly related to the fields in the frame structures described above. Each channel symbol carries some amount of digital data that is determined by the capacity of the channel and the specific modulation scheme employed. In one embodiment, the devices employ orthogonal frequency division multiplexing (OFDM) modulation to communicate data bits on each of multiple frequencies during a channel symbol period. Thus, the OFDM channel symbols are at least N sample periods long, where N is the number of frequency bins used to carry one OFDM symbol data. In other modulation schemes, the channel symbols may also be of a predetermined length or one or more sample periods.

A frequency hopping sequence is a sequence of frequencies bands ("channels") to be used by devices communicating during a superframe. Starting with the beginning of each frame (or with the beginning of the frame preamble if there is one) in the superframe, the devices transmit each channel symbol in a different channel as specified by the hopping sequence. The first channel symbol will be sent in the channel specified by the first element of the hopping sequence, the second channel symbol will be sent in the channel specified by the second element of the hopping sequence, and so on. The sequence of channels may be selected from a pool of possible hopping sequences. In one embodiment, the following pool of hopping sequences is employed:

HS_1={Channel_1, Channel_2, Channel_3, Channel_1, Channel_2, Channel_3, . . . (repeats)}
HS_2={Channel_3, Channel_1, Channel_2, Channel_2, Channel_1, Channel_3, . . . (repeats)}
HS_3={Channel_2, Channel_3, Channel_1, Channel_3, Channel_2, Channel_1, . . . (repeats)}
HS_4={Channel_3, Channel_2, Channel_1, Channel_1, Channel_3, Channel_2, . . . (repeats)}

The frequency hopping sequence may change from superframe-to-superframe. Each superframe uses one hopping sequence. A rotation sequence is used to specify the order in which the hopping sequences are employed. The rotation sequence may be selected from a pool of possible rotation sequences. In one embodiment, the following pool of rotation sequences is employed:

RS_1={HS_1, HS_1, HS_1, HS_3, HS_3, HS_3, . . . (repeats)}
RS_2={HS_2, HS_1, HS_1, HS_3, HS_3, HS_4, . . . (repeats)}
RS_3={HS_3, HS_1, HS_1, HS_3, HS_3, HS_1, . . . (repeats)}
RS_4={HS_4, HS_1, HS_1, HS_3, HS_3, HS_2, . . . (repeats)}
RS_5={HS_1, HS_2, HS_1, HS_3, HS_4, HS_3, . . . (repeats)}
RS_6={HS_2, HS_2, HS_1, HS_3, HS_4, HS_4, . . . (repeats)}
RS_7={HS_3, HS_2, HS_1, HS_3, HS_4, HS_1, . . . (repeats)}
RS_8={HS_4, HS_2, HS_1, HS_3, HS_4, HS_2, . . . (repeats)}
RS_9={HS_1, HS_3, HS_1, HS_3, HS_1, HS_3, . . . (repeats)}
RS_10={HS_2, HS_3, HS_1, HS_3, HS_1, HS_4, . . . (repeats)}
RS_11={HS_3, HS_3, HS_1, HS_3, HS_1, HS_1, . . . (repeats)}
RS_12={HS_4, HS_3, HS_1, HS_3, HS_1, HS_2, . . . (repeats)}
RS_13={HS_1, HS_4, HS_1, HS_3, HS_2, HS_3, . . . (repeats)}
RS_14={HS_2, HS_4, HS_1, HS_3, HS_2, HS_4, . . . (repeats)}
RS_15={HS_3, HS_4, HS_1, HS_3, HS_2, HS_1, . . . (repeats)}
RS_16={HS_4, HS_4, HS_1, HS_3, HS_2, HS_2, . . . (repeats)}
RS_17={HS_1, HS_1, HS_2, HS_4, HS_3, HS_3, . . . (repeats)}
RS_18={HS_2, HS_1, HS_2, HS_4, HS_3, HS_4, . . . (repeats)}
RS_19={HS_3, HS_1, HS_2, HS_4, HS_3, HS_1, . . . (repeats)}
RS_20={HS_4, HS_1, HS_2, HS_4, HS_3, HS_2, . . . (repeats)}
RS_21={HS_1, HS_2, HS_2, HS_4, HS_4, HS_3, . . . (repeats)}
RS_22={HS_2, HS_2, HS_2, HS_4, HS_4, HS_4, . . . (repeats)}
RS_23={HS_3, HS_2, HS_2, HS_4, HS_4, HS_1, . . . (repeats)}
RS_24={HS_4, HS_2, HS_2, HS_4, HS_4, HS_2, . . . (repeats)}
RS_25={HS_1, HS_3, HS_2, HS_4, HS_1, HS_3, . . . (repeats)}
RS_26={HS_2, HS_3, HS_2, HS_4, HS_1, HS_4, . . . (repeats)}
RS_27={HS_3, HS_3, HS_2, HS_4, HS_1, HS_1, . . . (repeats)}
RS_28={HS_4, HS_3, HS_2, HS_4, HS_1, HS_2, . . . (repeats)}
RS_29={HS_1, HS_4, HS_2, HS_4, HS_2, HS_3, . . . (repeats)}
RS_30={HS_2, HS_4, HS_2, HS_4, HS_2, HS_4, . . . (repeats)}
RS_31={HS_3, HS_4, HS_2, HS_4, HS_2, HS_1, . . . (repeats)}
RS_32={HS_4, HS_4, HS_2, HS_4, HS_2, HS_2, . . . (repeats)}

Piconets employing different rotation sequences will not collide repeatedly with one another on the same hopping sequence even if they become synchronized, and hence their mutual interference is greatly reduced. Even if overlapping piconets happen to use the same rotation sequence, they are not likely to be operating on the same hopping sequence for a prolonged period because the lengths and boundaries of their superframes are usually not identical. Both the hopping sequence pool and the rotation sequence pool may be designed to provide a minimum cross-correlation with other pool members given the size of the pool and the non-repeating length of the sequences as constraints.

The use of frequency hopping sequence rotation may offer other benefits specific to the piconet communications protocol. For example, it is expected that piconet member devices will occasionally miss beacons. Without the use of a specified rotation sequence, the loss of even a single beacon could cause a member device to lose track of the hopping sequence and have to drop out of the piconet. However, with knowledge of the specified rotation's sequence the piconet member devices are aware of the hopping sequence and may be able to participate in the superframe communications without having received the beacon.

FIG. 3 shows one embodiment of a frequency hopping sequence rotation information element 302. The information element includes an element identifier field 262 that specifies that the information element contains frequency hopping sequence rotation information. Also included is the length field 264 which may indicate that a payload of two bytes long follows. This payload is the information element payload and includes a hopping index field 304 and a rotation index field 306. The hopping index field 304 specifies the hopping sequence to be used during the current superframe, i.e., the current position in the rotation sequence. The rotation index field 306 specifies the rotation sequence currently being used by the piconet. Each of the fields 304 and 306 may be one byte long. The hopping index field 304 may be incremented in each beacon, rolling over to the initial value after the end of the rotation sequence is reached.

Each beacon may be required to include a frequency hopping sequence rotation information element immediately after the channel time allocation information element(s). By monitoring the frequency hopping sequence rotation information element, the piconet member devices can determine not only the hopping sequence for the current superframe, but also the hopping sequences for future superframes.

The rotation sequence may be changed by the PNC using the piconet parameter change procedure provided in the IEEE 802.15.3 standard. One embodiment is to treat a rotation sequence as a channel defined in that standard, and hence use the piconet parameter change procedure to change the channel to change the rotation sequence. Generally speaking, the parameter change procedure involves the inclusion of the piconet parameter change information element in a predetermined number of beacons before the change takes effect. This procedure ensures enough notice for all member devices to be alerted to the change even if a tolerable number of beacons are missed.

Figure 4:
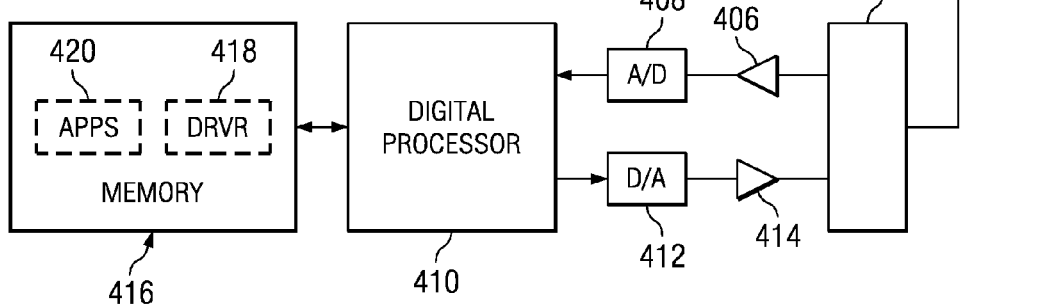
FIG. 4 shows a block diagram of an illustrative piconet member device.

FIG. 4 shows a block diagram of an illustrative piconet member device. Piconet frames are transmitted and received via an antenna 402. (At the frequencies of interest, the antenna may be implemented as a trace on a printed-circuit card.) A switch 404 couples the antenna 402 to an amplifier 406 during receive periods. The amplifier 406 may be followed by filter and frequency down-conversion circuitry (not specifically shown). An analog to digital converter 408 converts the receive signal into digital form for processing by a digital processor 410. The digital processor 410 may be implemented by hardware, firmware, or a combination of them. It performs demodulation and decoding of the receive signal to obtain receive data, and may further perform modulation and encoding of transmit data to produce a digital transmit signal. There may be another digital processor (not shown in FIG. 4) to handle MAC layer functions. A digital to analog converter 412 converts the digital transmit signal to an analog transmit signal, which is amplified by driver 414 and provided by switch 404 to antenna 402 during transmit periods. Frequency up-conversion and filter circuitry may be provided between the digital-to-analog converter 412 and the driver 414.

The operation of digital processor 410 may be partly controlled by software stored in memory 416. (The term "software" is intended to include firmware and processor instructions of any other type.) The software may include device drivers 418 to facilitate the communications between applications 420 and the digital processor 410. The digital processor 410 may include, or interact with, support hardware (not specifically shown) such as a keyboard, keypad, buttons, dials, a pointing device, a touch sensitive screen, an alphanumeric or graphics display, lights, a printer, speakers, a microphone, a camera, and/or other mechanisms for interfacing with a device user. Alternatively, or in addition, the support hardware may include nonvolatile information storage, a network interface, a modem, a sound card, a radio/television tuner, a cable/satellite receiver, or other electronic modules helpful to the device's purpose.

Numerous variations and modifications will become apparent to those skilled in the art once the above disclosure is fully appreciated. For example, different pools of hopping sequences and rotation sequences may be used. The pools may be significantly larger than the examples provided herein. It is intended that the following claims be interpreted to embrace all such variations and modifications.

What is claimed is:

1. A method of wireless communication that comprises:
   receiving a beacon frame that specifies a rotation sequence and a hopping sequence;
   determining if missing a subsequent beacon frame; and
   using the rotation sequence and hopping sequence received previously to determine a current frequency hopping sequence for a current superframe following the missed beacon frame.

2. The method of claim 1, further comprising:
   using the current frequency hopping sequence to receive a frame transmitted during the current superframe.

3. The method of claim 1, further comprising:
   using the current frequency hopping sequence to transmit a frame during the current superframe.

4. The method of claim 1, wherein the beacon frame includes an information element that specifies the rotation sequence and a frequency hopping sequence for a superframe following the beacon frame.

5. The method of claim 4, wherein the rotation sequence is specified in terms of a rotation index and the hopping sequence is specified in terms of a hopping index.

6. The method of claim 5, wherein the hopping index is incremented (with rollover) for each subsequent superframe.

7. The method of claim 1, wherein the hopping sequence is from a pool of hopping sequences that has a minimum cross-correlation.

8. A method of wireless communication that comprises:
   coordinating a series of superframes, wherein the coordinating includes transmitting a beacon for each superframe,
      wherein each beacon indicates a frequency hopping sequence to be used for communications during that superframe, and
      wherein each beacon specifies a rotation sequence indicative of frequency hopping sequences that will be used for communications in subsequent superframes; and
   using the frequency hopping sequence for each superframe to receive any frames other than the beacon during that superframe.

9. The method of claim 8, wherein each beacon frame includes an information element that specifies the rotation sequence and the frequency hopping sequence for the superframe following the beacon frame.

10. The method of claim 9, wherein the rotation sequence is expressed in terms of a rotation index and the hopping sequence is expressed in terms of a hopping index.

11. The method of claim 10, wherein the hopping index is incremented (with rollover) for each subsequent superframe.

12. A piconet member device that comprises:
   an antenna; a processor coupled to the antenna to receive and transmit piconet communications; and
   a memory coupled to the processor, wherein the memory stores software that configure the processor to:
      detect beacon frames in the received piconet communications, wherein the beacon frames delineate piconet superframes; and obtain from the beacon frames a rotation sequence for frequency hopping sequences;

determine if a beacon frame has been missed, and use the rotation sequence to determine a frequency hopping sequence for each superframe following a missed beacon frame.

13. The device of claim 12, wherein the software further configures the processor to:

use the frequency hopping sequences determined from the rotation sequence to receive data frames sent during superframes following missed beacon frames.

14. The device of claim 12 wherein the software further configures the processor to:

obtain from a received beacon a frequency hopping sequence for the superframe following the received beacon.

15. The device of claim 14, wherein the frequency hopping sequence is selected from a hopping sequence pool having a minimum cross-correlation.

16. The device of claim 12, wherein the rotation sequence is selected from a rotation sequence pool having a minimum cross-correlation.

17. A piconet coordinator device that comprises:

an antenna; and a processor coupled to the antenna to receive and transmit piconet communications, wherein the processor is configured to:

transmit beacon frames that delineate piconet superframes, wherein each beacon frame includes a field that specifies a rotation sequence for frequency hopping sequences, and further includes a field that indicates a frequency hopping sequence to be used in an associated superframe.

18. The device of claim 17, wherein the field that indicates a frequency hopping sequence contains a hopping index value that is incremented for each of multiple subsequent superframes.

19. The device of claim 17, wherein the field that indicates a frequency hopping sequence contains an identifier that specifies a frequency hopping sequence from a pool of available frequency hopping sequences.

20. The device of claim 19, wherein the pool of frequency hopping sequences has a minimum cross-correlation.

* * * * *